(12) United States Patent
Sans Rovira et al.

(10) Patent No.: US 8,016,328 B2
(45) Date of Patent: Sep. 13, 2011

(54) LOCKING DEVICE FOR THE DOOR OF AN APPARATUS COMPRISING A ROTARY DRUM, AND A LATCH FOR SUCH DEVICE

(75) Inventors: Ramon Sans Rovira, Tona (ES); Jordi Mas Gili, Ripoll (ES); Ignasi Riera Curcoll, Torelló (ES); Jaume Villar Febre, St. Julia de Vilatorta (ES)

(73) Assignee: Girbau S.A., Vic (ES)

( * ) Notice: Subject to any disclaimer, the term of this patent is extended or adjusted under 35 U.S.C. 154(b) by 764 days.

(21) Appl. No.: 11/792,434

(22) PCT Filed: Dec. 14, 2005

(86) PCT No.: PCT/ES2005/000677
§ 371 (c)(1),
(2), (4) Date: Mar. 12, 2008

(87) PCT Pub. No.: WO2006/064070
PCT Pub. Date: Jun. 22, 2006

(65) Prior Publication Data
US 2009/0096222 A1    Apr. 16, 2009

(30) Foreign Application Priority Data
Dec. 17, 2004    (ES) .................................. 200403004

(51) Int. Cl.
*E05C 19/10*    (2006.01)
*E05C 3/04*    (2006.01)
(52) U.S. Cl. .......... 292/96; 292/116; 292/118; 292/121; 292/126; 292/200; 292/213; 292/217; 292/219; 292/226

(58) Field of Classification Search .................. 292/95, 292/96, 100–102, 108, 116–118, 121, 126, 292/128, 195, 200, 202, 203, 210, 213, 217–219, 292/226, 228, 304, DIG. 69
See application file for complete search history.

(56) References Cited

U.S. PATENT DOCUMENTS
618,091 A * 1/1899 Hegel ............................. 292/128
(Continued)

FOREIGN PATENT DOCUMENTS
EP    0 878 576 A1    11/1998
(Continued)

OTHER PUBLICATIONS
International Search Report for PCT International Application No. PCT/ES2005/000677, mailed Mar. 7, 2006.

*Primary Examiner* — Carlos Lugo
(74) *Attorney, Agent, or Firm* — RatnerPrestia (57) ABSTRACT

The invention relates to a locking device for the door of an apparatus comprising a rotary drum, and to a latch for one such device. The inventive device comprises a latch articulated to a moving leaf of the door, and a control box attached to a fixed frame of the door and configured to receive and immobilize the tip of the latch into a passage provided therein. The aforementioned tip acts primarily as a control tip. The latch comprises at least one second tip acting as a coupling tip which is spaced apart from the control tip and which is configured such that it can be coupled in a retaining stop that is attached to the fixed frame of the door in a position spaced apart from the passage in the control box.

21 Claims, 4 Drawing Sheets

U.S. PATENT DOCUMENTS

| | | | |
|---|---|---|---|
| 970,133 A * | 9/1910 | Strid | 384/190.7 |
| 3,455,590 A * | 7/1969 | Zerfoss | 292/128 |
| 4,365,830 A | 12/1982 | Paulson | |
| 6,082,787 A * | 7/2000 | Chioffi et al. | 292/128 |
| 6,145,898 A * | 11/2000 | Onderka et al. | 292/228 |
| 6,568,719 B2 * | 5/2003 | Buscella | 292/85 |
| 6,612,625 B1 * | 9/2003 | Barber et al. | 292/87 |
| 7,269,981 B2 * | 9/2007 | Kwon | 68/3 R |

FOREIGN PATENT DOCUMENTS

| | | |
|---|---|---|
| ES | 525148 | 12/1984 |
| GB | 1 470 997 | 4/1977 |
| GB | 2 081 858 A | 2/1982 |
| GB | 2 107 383 A | 4/1983 |

* cited by examiner

LOCKING DEVICE FOR THE DOOR OF AN APPARATUS COMPRISING A ROTARY DRUM, AND A LATCH FOR SUCH DEVICE

This application is a U.S. National Phase Application of PCT International Application No. PCT/ES2005/000677, filed Dec. 14, 2005.

TECHNICAL FIELD

The present invention generally relates to a locking device for the door of an apparatus comprising a rotary drum, such as a washing, spinning or drying, machine and more specifically though not exclusively to a locking device for the door of an apparatus comprising a rotary drum with an axial loading aperture. The present invention also relates to a latch for such device.

STATE OF THE PRIOR ART

Electrical household or industrial appliances, such as washing machines, spinning machines, dryers, or combinations thereof, comprising a rotary drum adapted to house the items to be treated and assembled to rotate partially submerged in a liquid contained in a tub enclosed in a protective casing. In a classic arrangement, the drum is cylindrical and rotates about a horizontal shaft. For the access to the inside of the drum, both a wall of the drum and the casing include respective doors or openings. There are generally two alternative constructions. According to one of them, the door of the drum is arranged in the cylindrical wall thereof to provide an access in a radial direction, whereas the door of the casing can be arranged without distinction in an upper wall or a side wall of the casing. Both the door of the drum and the door of the casing are provided with respective closing leaves and, at least in the door of the casing, there is incorporated a locking device with a safety element operated by an electrically or electronically controlled actuator.

According to the other alternative construction, the door of the drum is an orifice arranged in a front wall of the drum, corresponding to a base of the cylinder, to provide an access in an axial direction. In this case, the door of the casing is arranged in a side wall thereof, and comprises a closing leaf articulated in relation to the casing and configured to close both the door of the casing and the orifice of the drum. A locking device with a safety element operated by an electrically or electronically controlled actuator is incorporated in order to ensure the locking of the leaf.

It is known a type of locking device for the door of an apparatus comprising a rotary drum comprising a latch associated to a handle which is pivotingly mounted on the moving leaf of the door, where the latch is pushed by at least one elastic element to a coupling position. The device comprises a control box attached to the fixed frame of the door, having a passage configured to receive therethrough a tip of said latch and a cam profile located next to said passage so as to move the tip of the latch against the thrust of the mentioned elastic element at the time of its introduction. The control box also comprises a slide having an opening for the passage of said tip of the latch therethrough. This slide is arranged next to the passage and configured to be moved in relation to the control box by the latch itself between an open position and a closed position, and a detection device is arranged to detect the slide in said closed position. In response to a signal from said detection device, an immobilizing device is operated by an electrically or electronically controlled actuator, such as a solenoid for example, to immobilize the slide in the closed position, and therewith the latch in said coupling position. Generally, the lock also comprises a delayed opening device operated by a bimetallic strip temporally retaining the slide in the closed position, and therewith the latch in the coupling position, when the current supply to said solenoid stops, either by a voluntary or a programmed disconnection of the system or due to accidental reasons.

Patent documents EP-A-0878576 and U.S. Pat. No. 6,082,787 describe commercially available locking devices of this type, which have a correct performance with domestic washing or drying machines, i.e., with reduced sizes, in which an opening force generated by an elastic joint compressed between the leaf and the frame of the door does not generally exceed a value of 40 N in the area of the latch. Nevertheless, when said devices are used in larger industrial machines, the coupling capability of the latch is not able to withstand forces of up to 200 N which the compressed elastic joints can get to exert in these cases. It forces the user to keep the sheet pressed against the frame compressing the elastic joint for a sufficient time period, generally of several seconds, until the slide is immobilized by the solenoid in the closing position.

Also, given that in these types of devices the latch performs both a control function and a coupling function, a re-dimensioning and modification of the configuration of the latch to ensure its coupling capability can result in a worsening of the control function, apart from resulting in a significant increase in the size of the passage, the slide and, all in all the entire assembly of the control box.

Patent GB-A-1470997 discloses a locking device for a spinning machine with a rotating drum comprising two independent latches assembled to pivot with respect to a common shaft. A slide is arranged to be pressed by the user for opening the door, and the return of the slide is slowed down by a delayed device such that the latches are consecutively released with a sufficient space of time between both so as to allow the total stop of the drum. However, this British patent does not describe or suggest the use of two latches or of a latch with two tips to ensure the coupling capability without affecting the control function.

An aspect of the present invention provides a locking device for the door of an apparatus comprising a rotary drum including latch means configured to provide an increased coupling capability, suitable for industrial apparatus such as washing machines, spinning machines, dryers, or combinations thereof and, at the same time, provide a correct control function without increasing the size of the control box.

DISCLOSURE OF THE INVENTION

According to a first aspect, the present invention provides a locking device for the door of an apparatus comprising a rotary drum, of the type comprising a latch which is pivotingly mounted on a moving leaf of said door, and a control box which is attached to the fixed frame of the door, said control box being configured to receive and lock a tip of said latch. The device is characterized in that said tip of the latch acts primarily as a control tip and the latch comprises at least one second tip acting as a coupling tip configured to be coupled in a retaining stop.

The control box comprises a passage to receive therethrough said control tip, and said coupling tip is spaced apart from the control tip and is configured such that it can be coupled in said retaining stop, which is in a spaced apart position from the passage of the control box. If considered convenient, there is no technical obstacle for said retaining stop to be independent of the control box. When the latch is in the coupling position, the coupling configuration of the coupling tip has a contact surface parallel to a corresponding contact surface of said retaining stop and substantially perpendicular to the direction of an opening force generated by at least one elastic joint compressed between said leaf and the frame of the door.

In one exemplary embodiment, the latch is pushed by at least one elastic element to a coupling position, and the mentioned control box comprises, apart from the mentioned passage, at least one cam profile located next to said passage so as to move said tip of the latch against the thrust of said elastic element at the time of its introduction; a slide with an opening arranged for the passage of said tip of the latch therethrough, said slide being configured to be moved in relation to the control box by the latch between an open position and a closed position; a detection device configured to detect the slide in said closed position; and an immobilizing device operated by an electrically or electronically controlled actuator and configured to immobilize the slide in the closed position, and therewith the latch in said coupling position, in response to a signal from said detection device.

With this construction, coupling and control functions of the latch, which in the devices of the state of the art are assigned to a single tip thereof, are here substantially made independent and carried out respectively by specialized control tip and coupling tip. The control tip is smaller and is provided with an optimized profile to cause, in cooperation with the mentioned cam profile, the movement of the slide both in the operation of introduction into the passage of the control box and in the operation of extraction, whereas the coupling tip is larger and has an optimized profile for solidly coupling in said retaining stop. The two tips of the latch are integral in one same part, therefore the control actions transmitted by the slide to the control tip also affect the coupling tip.

When the latch is in the coupling position, the mentioned coupling configuration of the coupling tip and the retaining stop preferably have respective contact surfaces that are mutually parallel and substantially perpendicular to the direction of an opening force generated by an elastic joint compressed between said leaf and the frame of the door, therefore the resistance force offered by the surfaces in contact is maximum, directed in the opposite direction and without any component in other directions. These opening and resistance forces are substantially perpendicular to an imaginary plane defined by the opening of the door.

According to a second aspect, the present invention provides a latch applicable to a locking device for the door of an apparatus comprising a rotary drum, of the type which is configured to be pivotingly mounted on the moving leaf of said door, and comprising a tip that can be received and locked in a control box which is attached to the fixed frame of the door. The latch is characterized in that said tip acts primarily as a control tip, and in that it comprises at least one second tip acting as a coupling tip configured to be coupled in a retaining stop.

BRIEF DESCRIPTION OF THE DRAWINGS

The previous and other features and advantages will be more fully understood from the following detailed description of an exemplary embodiment with reference to the accompanying drawings, in which.

DETAILED DESCRIPTION OF AN EXEMPLARY EMBODIMENT

Figure 1:
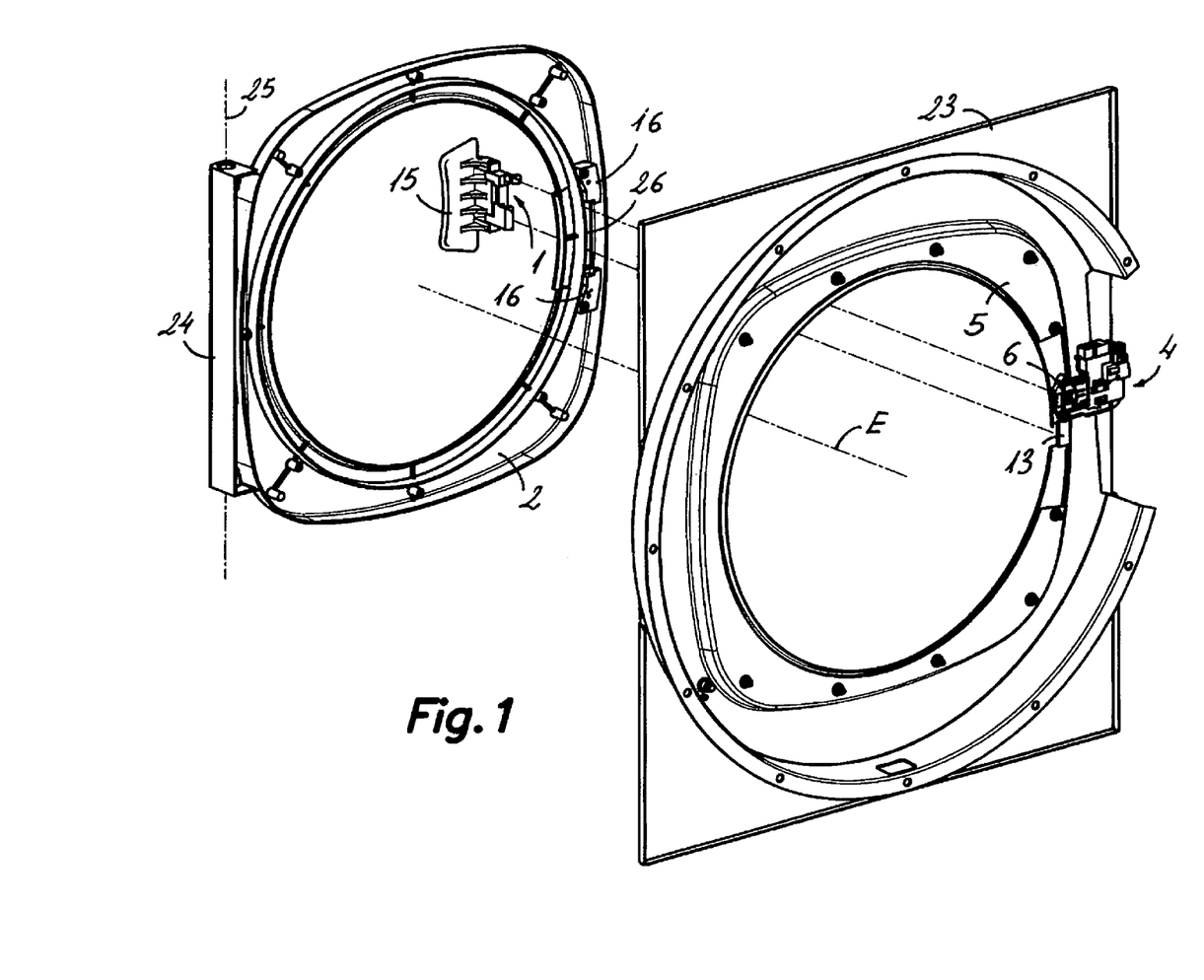
FIG. 1 is a perspective exploded view showing the components of a locking device according to an exemplary embodiment of the present invention in relation to a door moving leaf and frame of an apparatus comprising a rotary drum, such as a industrial type washing-spinning machine.

With reference first to FIG. 1, the device according to an embodiment of the present invention is shown in relation to a moving leaf 2 and a fixed frame 5 of a door of an apparatus comprising a rotary drum, such as industrial type washing-spinning machine. In this illustrated exemplary embodiment, the apparatus is of the type comprising a drum (not shown) having a substantially cylindrical shape and arranged to rotate around a horizontal shaft aligned with shaft E of FIG. 1. The drum has a concentric circular orifice arranged in a front wall thereof. A door defined by a circular fixed frame 5, centered in relation to shaft E is arranged in a front panel 23 of the apparatus. The fixed frame 5 conventionally includes at least one or more reinforcing plates around the opening of the door in the front panel 23. The mentioned door has a moving leaf 2 assembled on the front panel 23 by means of a hinge device, 24 arranged in a side of the moving leaf 2 and of the fixed frame 5, such that the moving leaf can rotate in relation to a shaft 25 between an open situation and a closed situation. An opening 26 is defined in a side of the moving leaf 2 opposite to the mentioned hinge 24, and an assembly of elements forming part of the locking device is fixed to the moving leaf 2, next to said opening 26. This assembly of elements fixed to the moving leaf 2 includes supports 16 in which a handle 15 and a latch 1 having a control tip 1a and a coupling tip 1b are assembled, which will be described in detail below in relation to FIG. 2.

Figure 6:
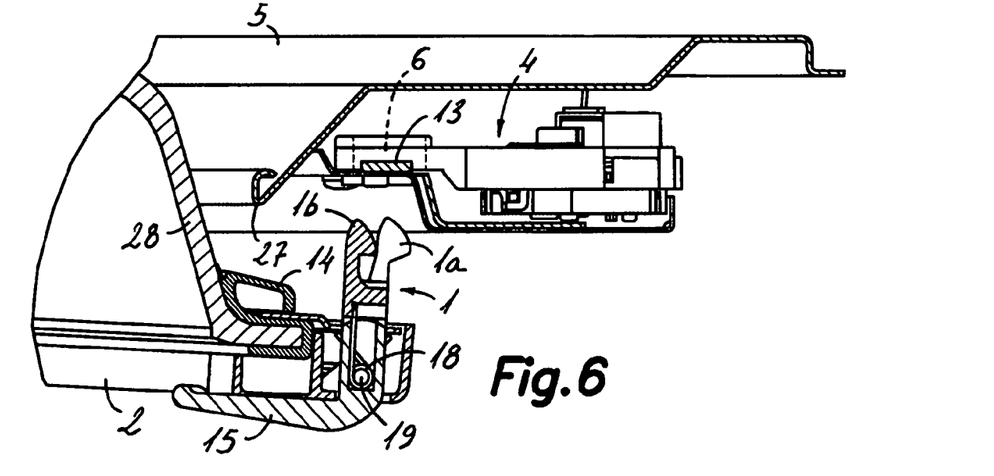
FIG. 6 is a partial cross-sectional view taken through the plane VII-VII of FIG. 5, but with the moving leaf of the door half-open and the latch uncoupled from the control box.
Figure 7:
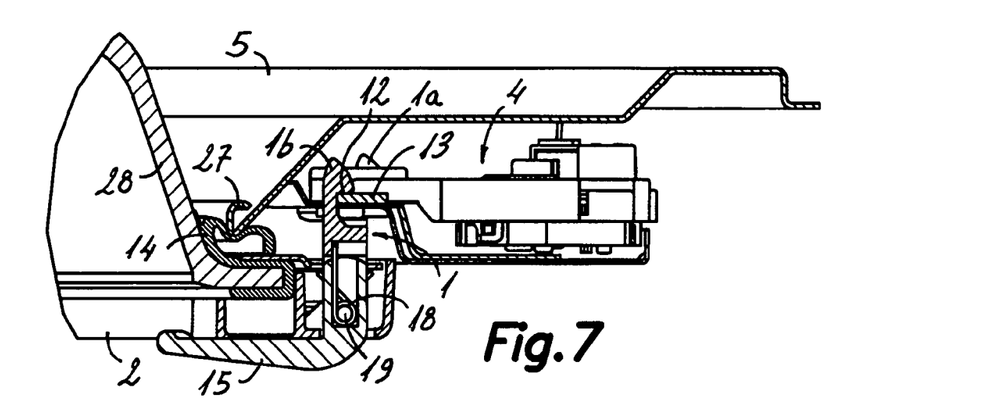
FIG. 7 is a partial cross-sectional view taken through the plane VII-VII of FIG. 5, with the latch coupled to the control box.

The moving leaf 2 in turn defines a frame in the hollow of which typically a concave panel 28 and a perimetric elastic joint 14 shown partially in FIGS. 6 and 7 are assembled. The generally transparent concave panel 28 has a circular contour which is centered in relation to shaft E and is configured so as to partially penetrate through the opening defined by the fixed frame 5 when the moving leaf is in the closed situation. A projecting lip 27 located in the inner perimeter of the fixed frame 5 presses the elastic joint 14 when the moving leaf 2 is in the closed situation (FIG. 7). The assembly of the moving leaf 2 thus closes the opening of the door defined by the fixed frame 5.

Figure 5:
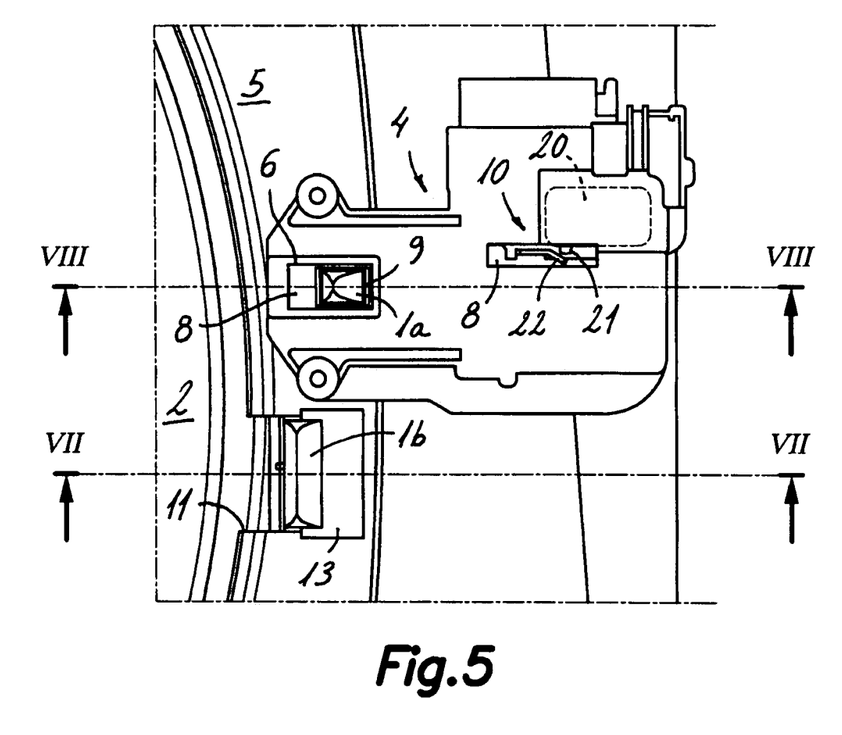
FIG. 5 is a detail plan view showing a control box belonging to the elements of the device linked to the fixed frame of the door, with the latch of FIGS. 3 and 4 coupled thereto.

Returning briefly to FIG. 1, a control box 4 including immobilizing and control devices for immobilizing and controlling the locking device, and a retaining stop 13, the functions of which will be described in detail below in relation to FIG. 5, are fixed at an inner face of the fixed frame 5, in the side opposite to the hinge 24.

Figure 2:
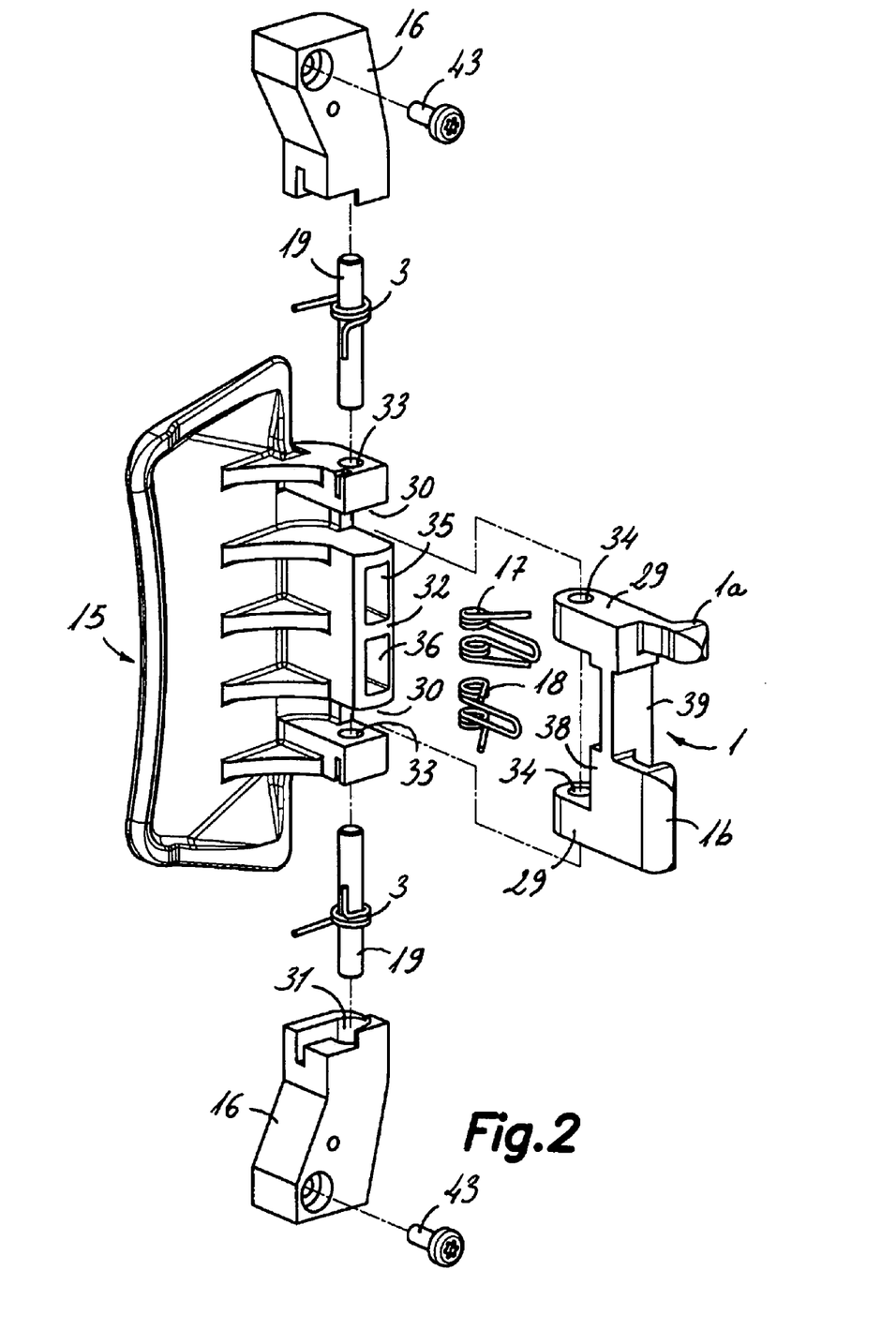
FIG. 2 is a perspective exploded view of the elements of the device linked to the moving leaf of the door shown in FIG. 1, including a latch and a handle.

With reference now to FIG. 2, the assembly of elements of the locking device linked to the moving leaf 2 comprises a pair of supports 16 configured to be fixed to an inner face of leaf 2 of the door (see FIG. 1) by means of screws 43 for example. Each support 16 has a hole 31 in which a shaft 19 is inserted. The mentioned handle 15 has a holding area located in the outer side of the moving leaf 2 and an appendage 32 configured to be passed through said opening 26 of the moving leaf 2 (FIG. 1). The mentioned appendage 32 of the handle 15 defines transverse notches 30 and mutually aligned holes 33 communicating end faces of said appendage with the mentioned notches 30. The latch 1 has a pair of legs 29 configured to fit in the notches 30 of the handle 15, and comprising respective mutually aligned holes 34 and, when assembled, the shafts 19 are inserted in the holes 33 of the handle 15 and in the holes 34 of the latch 1, such that the handle 15 and the latch 1 can pivot in relation to a common geometric shaft defined by shafts 19.

The handle 15 can rotate in relation to the moving leaf 2 between an opening position and a closing position. Around the shafts 19 there is arranged a pair of elastic elements 3 connected to the respective support 16 and to the handle 15 so as to push the handle 15 towards said closing position. The latch 1 can rotate in relation to the handle 15 in opposite directions with respect to a central position which, when the handle 15 is in the closing position, corresponds to a coupling position of the latch 1. Between the handle 15 and the latch 1 there is arranged a pair of elastic elements 17, 18 so as to push the latch 1 in opposite directions in order to provide a stable balanced position for the latch 1 corresponding to said central position in relation to the handle 15. The mentioned elastic elements 17, 18 are housed in corresponding cavities 35, 36 existing in the appendage 32 of handle 15 and have respective pushing ends arranged to press on stops 37, 38 of the latch 1, better shown in FIGS. 3 and 4.

Figure 3:
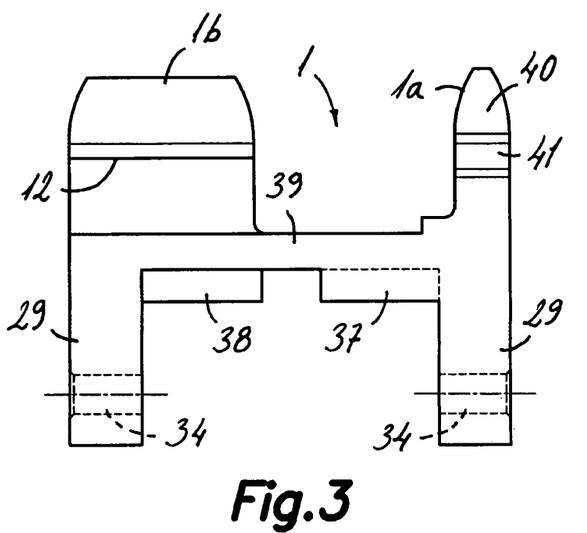
FIGS. 3 and 4 are front and profile elevational views respectively, of the latch of the present invention shown in FIGS. 1 and 2.
Figure 4:
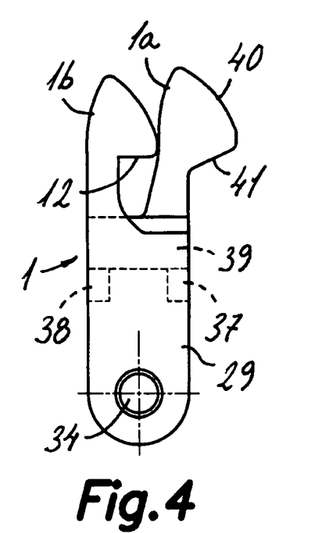
Figure 8:
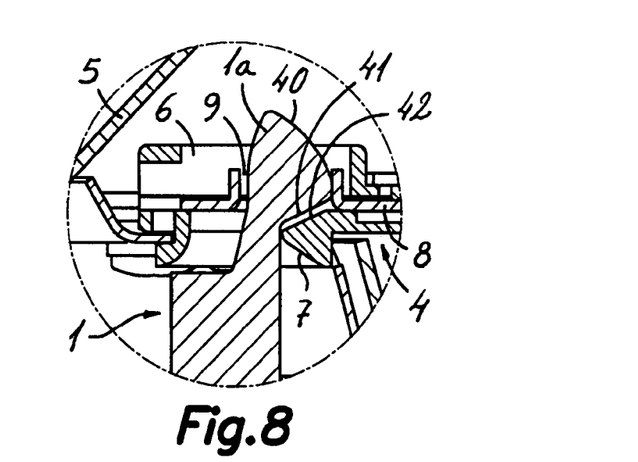
FIG. 8 is a detail enlarged cross-sectional view taken through the plane VIII-VIII of FIG. 5.

The latch 1 is described below in relation to FIGS. 3 and 4. The latch 1 is a one piece body defining the mentioned separate legs 29, which are provided with respective mutually aligned holes 34 to receive the shafts 19. The legs 29 are connected by a bridge 39 from which the mentioned stops 37, 38 project in the direction of the legs 29, the pushing ends of said elastic elements 17, 18 being to be supported on the stops 37, 38. As shown in FIG. 4, the stops 37 and 38 are next to opposite sides of the latch 1. The control tip 1a and the coupling tip 1b extend from the bridge 39 in a direction opposite to the legs 29. The control tip 1a is less wide and comprises an inlet cam profile 40 configured to cooperate with an inlet cam profile 7 of the control box 4, and an outlet cam profile 41 configured to cooperate with a corresponding outlet cam profile 42 of the control box 4, as described below in relation to FIGS. 5 to 8. The coupling tip 1b, which is wider, is spaced apart from said control tip 1a and comprises a coupling configuration 12 configured to be coupled in said retaining stop 13 attached to said fixed frame 5 of the door, next to the control box 4. The mentioned coupling configuration 12 and the retaining stop 13 have respective substantially planar contact surfaces. When the latch is in its coupling position, the respective contact surfaces of the coupling configuration 12 and the retaining stop 13 are mutually parallel and substantially perpendicular to the direction of an opening force generated by an elastic joint 14 compressed between said leaf 2 and the fixed frame 5 of the door, as can be seen in FIGS. 7 and 8.

FIG. 5 shows the control box 4 fixed to an inner side of the fixed frame 5 of the door. The control box 4 comprises a passage 6 configured to receive therethrough the control tip 1a of the latch 1. Said passage 6 obviously coincides with an opening (not shown) of the fixed frame 5. As shown in FIG. 8, the mentioned inlet cam profile 7 is next to the passage 6 and is located to cooperate with said inlet coupling profile 40 of the control tip 1a so as to move said tip 1a, and therewith the entire latch 1, towards a uncoupling position against the combined thrust of the mentioned elastic elements 3 and 17, at the time of its introduction. The mentioned outlet cam profile 42 is also next to said passage 6 and is located to cooperate with said outlet cam profile 41 of the control tip 1a so as to move said tip 1a, and therewith the entire latch 1, towards said uncoupling position against the combined thrust of the mentioned elastic elements 3 and 17 when an extraction movement is carried out. The control box 4 also includes a slide 8 having an opening 9 arranged for the passage of said tip 1a of the latch 1 therethrough. The mentioned slide 8 is configured to be moved in relation to the control box 4 by the control tip 1a of the latch 1 between an open position and a closed position. The control box 4 incorporates a detection device 10 configured to detect the slide 8 in said closed position. In the illustrated embodiment, the mentioned detection device 10 comprises a microswitch 20 (FIG. 5) comprising a push button 21 arranged so as to be pressed or released by an appendage 22 of the slide 8 when the latter is in the closed position.

The control box 4 also includes an immobilizing device (not shown) operated by an electrically or electronically controlled actuator and configured to immobilize the slide 8 in the closed position in response to a signal from said detection device 10. The tip 1a of the latch 1 is thus immobilized in the coupling position shown in FIG. 8. Given that the control and coupling tips 1a, 1b of the latch 1 are integral of a single part, the coupling tip 1b of the latch 1 is also immobilized in a coupling position with the retaining stop 13. The mentioned actuator of said immobilizing device comprises, for example, a solenoid (not shown) configured so as to move a pin between a withdrawn position and an extended position in which said pin is inserted in an opening of the slide 8 so as to retain it in the closed position. If an attempt is made to open the moving leaf 2 by pushing the handle 15 towards its opening position when the latch 1 is immobilized by the slide 8, a combined deformation of the mentioned elastic elements 3 and 18 allows the handle 15 to rotate towards the opening position without causing any opening effect and without unsuitably forcing the latch 1 or the elements of the control box 4.

The control box 4 optionally further includes a delayed opening device (not shown) operated by a bimetallic strip and configured to temporarily retain the slide 8 in the closed position, and therewith the latch 1 in the coupling position, when a current supply to said solenoid stops.

As shown in FIG. 5, the retaining stop 13 is attached to said fixed frame 5 of the door, next to a groove 11 in the inner edge thereof, in a spaced apart position from the passage 6 of the control box 4. In the illustrated embodiment, the retaining stop 13 is completely independent of the control box 4, and the latch 1, by virtue of the separation between its control and coupling tips 1a, 1b, is simultaneously coupled and decoupled in the passage 6 of the control box 4 and in the retaining stop 13.

With this arrangement, the control function of the latch 1 is mainly carried out by the control tip 1a by virtue of its inlet and outlet cam profiles 40, 41, where as the coupling function of the latch 1 is mainly carried out by the coupling configuration 1b thanks to the greater coupling capability thereof provided by its special coupling configuration 12 and its greater width. Furthermore, with this arrangement, the latch 1 with its control and coupling tips 1a, 1b can work with a control box 4 which is unaltered in relation to those of the commercially available devices of the state of the art.

A person skilled in the art can introduce variations and modifications in the shown and described exemplary embodiment without departing from the scope of the present invention as it is defined in the attached claims.

The invention claimed is:

1. A locking device for the door of an apparatus comprising a rotary drum, said locking device comprising a latch which is pivotingly mounted on a moving leaf of said door, and a control box which is attached to a fixed frame of the door, said control box having a passage to receive therethrough a first tip of said latch by a pivoting movement of the latch when said moving leaf is put in a closed position, and an immobilizing device operated by an electrically or electronically controlled actuator to immobilize said first tip of the latch in a coupled position in said passage in response to a signal from a detection device representative of the latch in said coupled position, the control box controlling functions of said apparatus depending on the position of the first tip, wherein the latch comprises a second tip configured and arranged to move together with said first tip and to couple in a retaining stop attached to said fixed frame by virtue of said pivoting movement of the latch substantially at the same time the first tip is received and locked in the passage of the control box, thereby said second tip of the latch is retained in a coupling position coupled to said retaining stop by the first tip when the first tip is immobilized in its coupling position by the control box, and thereby the first tip of the latch acts primarily as a control tip and the second tip acts as a coupling tip.

2. A device according to claim 1, wherein said retaining stop is in a spaced apart position from the passage of the control box and said coupling tip is spaced apart from the control tip and comprises a coupling configuration configured to be coupled in said retaining stop.

3. A device according to claim 2, wherein said retaining stop is independent of the control box.

4. A device according to claim 1, wherein when the latch is in the coupling position, said coupling configuration has a contact surface parallel to a corresponding contact surface of said retaining stop and substantially perpendicular to the direction of an opening force generated by at least one elastic joint compressed between said moving leaf and the fixed frame of the door.

5. A device according to claim 1, wherein the latch is pushed by at least one elastic element towards a coupling position.

6. A device according to claim 5, wherein the control box comprises cam profiles located next to the passage so as to move the control tip of the latch against the thrust of said elastic element at the times of its introduction and extraction, respectively, a slide with an opening arranged relative to the passage for receiving the control tip of the latch therethrough, said slide being disposed to be moved in relation to the control box by the control do of the latch between an open position and a closed position, wherein said detection device is configured to detect the slide in said closed position, and wherein said immobilizing device is configured to immobilize the slide in the closed position, and therewith the latch in its coupling position, in response to said signal from said detection device.

7. A device according to claim 6, wherein the latch is associated with a handle which is articulated in at least one support fixed to the leaf of the door such that it can rotate between an opening position and a closing position, said at least one elastic element being arranged between said support and said handle so as to push the handle towards said closing position.

8. A device according to claim 7, wherein the latch is pivotingly mounted on the handle such that it can rotate in opposite directions in relation to a central position corresponding to said coupling position of the latch when the handle is in said closing position, at least one pair of elastic elements being arranged between the handle and the latch so as to push the latch in opposite directions to provide a stable balanced position for the latch in relation to the handle corresponding to said central position.

9. A device according to claim 8, wherein a common shaft is provided for articulating the handle in relation to the support and for articulating the latch in relation to the handled.

10. A device according to claim 6, wherein said detection device comprises a microswitch having a push button arranged so as to be pressed or released by the slide when the latter is in the closed position.

11. A device according to claim 6, wherein said electrically or electronically controlled actuator for operating said immobilizing device comprises a solenoid configured so as to move a pin between a withdrawn position and an extended position in which said pin is inserted in an opening of the slide so as to retain it in the closed position.

12. A device according to claim 11, further comprising a delayed opening device operated by a bimetallic strip and configured to temporarily retain the slide in the closed position, and therewith the latch in the coupling position, when a current supply to said solenoid ceases.

13. A latch for a locking device for a door of an apparatus comprising a rotary drum, said latch being configured to be pivotingly mounted on a moving leaf of said door, and comprising a first tip which is received in a passage of a control box attached to a fixed frame of the door by a pivoting movement of said latch when said moving leaf is put in a closed position and immobilized by an immobilizing device operated by an electrically or electronically controlled actuator of said control box in a coupling position in said passage in response to a signal from a detection device representative of the latch in said coupled position, the control box controlling functions of said apparatus depending on the position of the first tip, wherein the latch comprises a second tip configured and arranged to move together with said first tip and to couple with a retaining stop attached to said fixed frame by virtue of said pivoting movement of the latch substantially at the same time the first tip is received and locked in the passage of the control box, thereby the second tip of the latch is retained in a coupling position coupled to said retaining stop when the first tip is immobilized in its coupling position by the control box, and thereby the first tip of the latch acts primarily as a control tip and the second tip acts as a coupling tip.

14. A latch according to claim 13, wherein said retaining stop is in a position spaced apart from said passage of the control box and said coupling tip is spaced apart from said control tip and comprises a coupling configuration configured to be coupled in said retaining stop.

15. A latch according to claim 14, wherein the coupling tip and the control tip are spaced apart so as to respectively and simultaneously couple in and decouple from said retaining stop sand said passage of the control box, the retaining stop being independent of the control box.

16. A latch according to claim 14, wherein said coupling configuration has a contact surface which, when the latch is in the coupling position, is substantially parallel to a corresponding contact surface of said retaining stop and substantially perpendicular to the direction of an opening force generated by at least one elastic joint compressed between said leaf and the fixed frame of the door.

17. A latch according to claim 13, wherein the latch comprises at least one leg opposite the control and coupling tips configured to be associated to a handle which is pivotingly mounted on at least one support fixed to the leaf of the door such that said handle can pivot between an opening position and a closing position, least one elastic element being arranged between said support and said handle so as to push the handle towards said closing position.

18. A latch according to claim 17, wherein said at least one leg is configured to be pivotingly mounted on the handle such that the latch can rotate in opposite directions in relation to a central position corresponding to said coupling position of the latch when the handle is in said closing position, at least one pair of elastic elements being arranged between the handle and the latch so as to push the latch in opposite directions to provide a stable balanced position for the latch in relation to the handle corresponding to said central position.

19. A latch according to claim 18, wherein the articulation of the latch in relation to the handle and the articulation of the handle in relation to the support comprises a common shaft.

20. A latch according to claim 19, wherein the control tip is smaller than the coupling tip and is provided with an optimized profile to cooperate with the control box, whereas the coupling tip is larger than the control tip and has an optimized profile for solidly coupling in said retaining stop.

21. A latch according to claim 19, wherein the control tip and the coupling tip are integral in one same part, thereby the control actions transmitted by the control box to the control tip also affect the coupling tip.

* * * * *